Feb. 16, 1943.   J. WORTH   2,311,149
AUXILIARY TABLE TOP
Filed May 21, 1941

INVENTOR.
Joseph Worth
BY Edward Thomas
his ATTORNEY

Patented Feb. 16, 1943

2,311,149

UNITED STATES PATENT OFFICE 2,311,149

AUXILIARY TABLE TOP

Joseph Worth, Flushing, N. Y., assignor to D. F. H. Novelty Furniture Co., Inc., Brooklyn, N. Y., a corporation of New York Application May 21, 1941, Serial No. 394,430

3 Claims. (Cl. 311—103)

This invention relates to auxiliary table tops and is herein illustrated in some detail as embodied in a board adapted to be used as a bread cutting board on top of the table but adapted to be swung under the table so that it disappears from outside view.

In many kitchens, and to some extent elsewhere, it is customary to work at tables with tops of enameled metal. When unmarred such tops are easily cleaned and are highly sanitary. But kitchen tables are used for many purposes, such as supporting bread or cabbage while it is being sliced or cut. Good housekeepers, however, are careful not to cut or slice materials on the bare table top, because of the danger of marring or permanently injuring the enamel and also of dulling the cutting knife.

Most housekeepers, therefore, try to keep a bread board handy so that it can be readily laid on the table and serve as a support for the bread while it is cut. Often a housekeeper is unable to find a suitable place in which to store the breadboard, because the board is usually too wide to lie flat on a convenient shelf, and is inconvenient to take out if stood up on a shelf behind dishes or pans. For these and other reasons, the bread board is often not at hand when wanted.

Pull out leaves, sliding under the table top, or hinged leaves dropping down and supported by hinged brackets are usually a little low for convenient slicing, and, moreover, they project out from the normal end of the table top so they are often seriously in the way. In addition, a user has to reach down behind the leaf to swing a hinged bracket to support the leaf. Besides all this it is found that pull out leaves are unsanitary because food particles lie on them and get pushed in behind them under the table tops.

According to present invention, the foregoing and other difficulties and objections are overcome, and an auxiliary table top is provided which completely disappears under the table, which is securely held there, yet is readily released and swung up or swung back by subconscious movements without any conscious attention of the user, and which may be larger than a pull out leaf of the same table because it requires no support other than the table top on which it rests.

The guiding devices may be provided which automatically hold the auxiliary top against sliding or twisting, and the parts may be so designed that mere fastening the parts in position is all the assembling needed.

Other features and advantages will hereinafter appear.

In the accompanying drawing.

Figure 1:
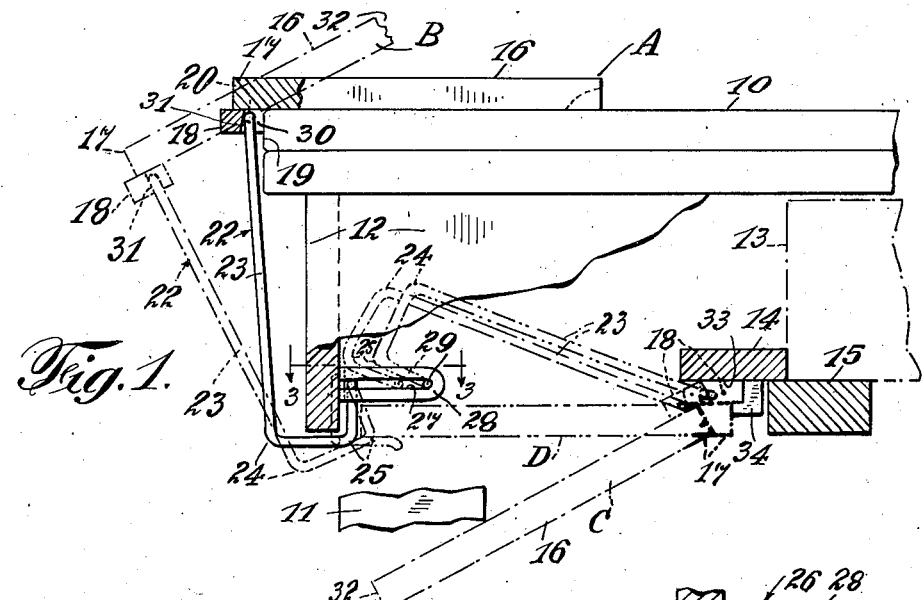
Figure 1 is a fragmentary side view of a table embodying the device, with parts broken away, and showing successive positions of the device in broken lines.
Figure 2:
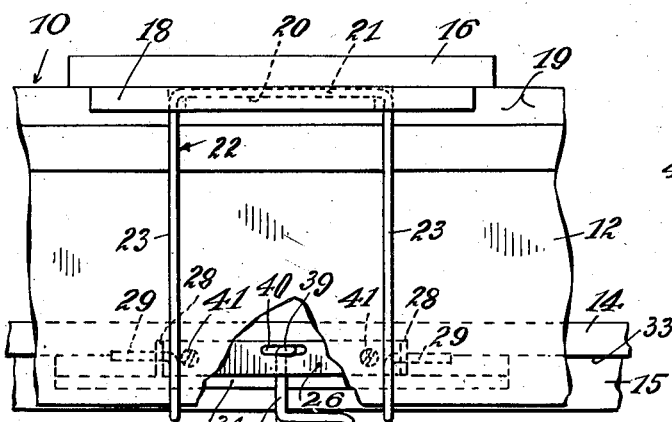
Figure 2 is an end view of the same with the auxiliary top lying on the table.

One form of modern kitchen table includes a top 10 which may be of enamelled metal, corner legs 11, and a skirt or apron 12. Often the table includes a drawer 13 which runs on cross-pieces 14 and 15.

In the form of the invention shown an auxiliary table top 16 carries on an overhanging end 17, a bottom wooden cleat 18 suitably nailed or screwed to it and adapted to lie against the nearly flat edge 19 of the table top.

In the form shown the cleat 18 is slotted at 20 on the face which lies against the auxiliary top 16, and the straight center section 21 of a guide or bail 22 lies in the slot so that its arms 23 swing around the slot. To permit this swing the cleat 18 is additionally cut out at 30 at each arm 23 to give the arms a limited throw described below, and hold it sideways because the sides of the cuts 30 lie against the arms 23.

The arms 23, in the form shown are bent at 24 under the apron 12 and then up behind it at 25 until they reach the center line of a guide bracket 26. Midway of the height of the bracket 26, the arms 23 are shown as each bent outwardly and as guide pivots 29 passing through slots 27 in outwardly bent wings 28 of the bracket 26.

Thus the guide pivots 29 form together a pivot or shaft on which the bail 22 and its board 16 may swing and be guided as it swings away from the table top 10.

In the form shown the cleat 18 allows the auxiliary top 16 to be swung up an inch or two from the top 10 before the arms 23 arrest the swinging by bringing the backs 31 of the slots 30 against the arms 23, thus enabling the auxiliary top 16 to be swung without rubbing against the top 10.

The auxiliary top 16 is shown in full lines at A in position for use. When beginning to cause the auxiliary top to move to disappearing position the free end 32 is tilted up slightly and moved backward to broken line position B. Then the auxiliary top 16 is swung down and backwardly until the bends at 25 strike the inside of the apron 12 and force the guide pivots 29 of the bail 22 along the slots 27. These bends 25 cam backwardly the auxiliary top 16. The hand which has been pushing the auxiliary top 16 in place naturally continues to push it backwardly.

The cleat 18 now lies on top in the broken line position C of the auxiliary top and may strike the bottom 33 of one of the usual cross bars 14 built into such tables. Naturally the hand of the user tends to lift the auxiliary top 16 and it is found that the cleat 18 just clears the end of a ledge 34 projecting as an L from the bottom of the cross bar 14 and when the auxiliary top 16 rises to the bottom of the apron 12, and the pivots 29 of the bail 22 strike the rear end of the slots 29, the cleat 18 slips over the ledge 34 and is supported by that ledge. It is found that a person's hand thus locates or seats the auxiliary top 16 sub-consciously at broken line position D. In this position the auxiliary top 16 faces down so no dust can fall on it and any food particles on it fall off, thus the auxiliary top is thoroughly sanitary.

Then, after one or two attempts, the hand equally subconsciously turns the bottom horizontal arm 35 of a latch 36 to underlie the free end of the auxiliary top, thus supporting it at the apron 12, and thus holding the cleat on the ledge 34.

Figure 3:
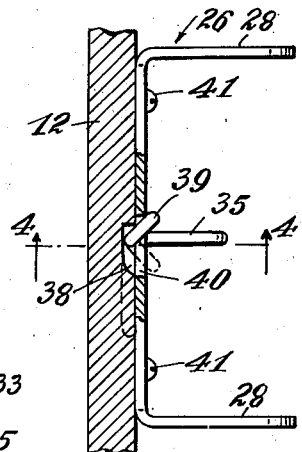
Figure 3 is an enlarged view on the line 3—3 of Figure 1, showing the latch in locked position.
Figure 5:
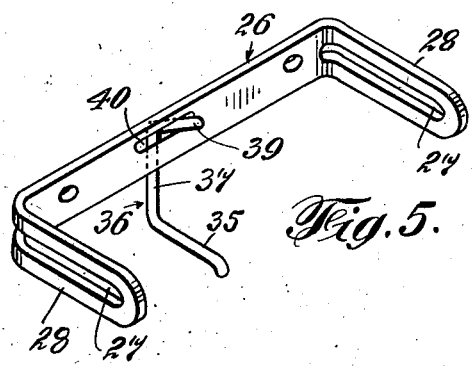
Figure 5 is a perspective view of a guide bracket showing the latch as in Figure 3.
Figure 4:
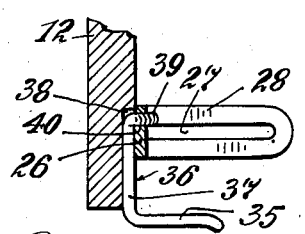
Figure 4 is a side view on the line 4—4 of the parts seen in Figure 3.

The latch 36 is shown as having a vertical bail 37 which lies in a kerf 38 in the apron 12, and as also having a short projecting upper arm 39 which lies in a short slot 40 in the bracket 26, the slot being so proportioned that it arrests the short upper arm when the latch is ineffective or out of use, as shown in dotted lines in Figure 3, and it arrests the short upper arm when the latch 35 projects out as in full lines in Figures 3 and 4 to support the auxiliary top 16. Thus the latch is positioned easily and subconsciously.

The bracket 26 and latch 36 are readily assembled by putting the bail 37 in the kerf 38 putting the bracket 26 against the face of the apron with the upper arm 39 in place in its slot, 40 and fastening the bracket in place as by screws 41.

The bail member 22 is shown as of heavy resilient iron wire so that it is readily bent to shape and the long pivots 29 are easily sprung together to enable them to be inserted in the slots 29. Thus the whole device is cheaply built, cheaply installed, and yet holds the auxiliary top 16 strongly in position while resting on top of 10 and is prevented from moving left or right or sideways because the vertical stretches of the bail between the bends 25 and the pivots 29 hold the cleat 18 of the auxiliary top 16 against the edge of the table top 10 making the guide pivots fixed pivots in effect to hold the auxiliary top against twisting and the bail also holds the auxiliary top 16 down, so that the auxiliary top 16 is in effect locked in position, but releasable by tilting to position B.

In addition the auxiliary top is readily removed for thorough washing, as at a sink, thus ensuing sanitary convenience.

Having thus described one embodiment of my invention, what I claim is:

1. An auxiliary table top device adapted to fit on a table having a top and an apron beneath the top, said device including a board to lie on the table top, a bail on which the board is pivoted at one end, slotted bracket ears adapted to fit inside the apron, pivots on the bail adapted to be inside the slots at one end to hold the board against sliding and slidable to the other end of the slot, to carry the board rearwardly under the table top as the board turns upside down, and U-bends in the bail between the board and the pivots passing under the edge of the apron and adapted to swing up and against the apron to thrust the pivots to said other end and carry the board rearwardly.

2. An auxiliary table top device adapted to fit on a table having a top and an apron beneath the top, said device including a board to lie on the table top, a cleat on the board to be against the end of the table top, a bail on which the board is pivoted at the cleat, slotted bracket ears adapted to fit inside the apron, pivots on the bail adapted to be inside the slots at one end to hold the board against sliding and slidable to the other end of the slot to carry the board rearwardly under the table top as the board turns upside down, and U-bends in the bail between the board and the pivots passing under the edge of the apron and adapted to swing up and against the apron to thrust the pivots to said other end and carry the board rearwardly so that the cleat may overlie an edge on the table to support the top.

3. An auxiliary table top device adapted to fit on a table having a top, an apron beneath the top, and a cross bar behind the apron, said device including a board to lie on the table top, a cleat projecting from the board and adapted to lie against the table top, a bail on which the board is pivoted at the cleat, slotted bracket ears adapted to fit inside the apron, pivots on the bail adapted to lie inside the slots at one end to hold the board against sliding and slidable to the other end of the slot to carry the board rearwardly under the table top as the board turns upside down, and U-bends in the bail between the board and the pivots passing under the edge of the apron and adapted to swing up and against the apron to thrust the pivots to said other end and carry the board rearwardly so that the cleat may overlie and be supported by said cross-bar.

JOSEPH WORTH.